US009374425B2

(12) United States Patent
O'Connell et al.

(10) Patent No.: US 9,374,425 B2
(45) Date of Patent: *Jun. 21, 2016

(54) BEHAVIOR BASED CLIENT SELECTION FOR DISPARATE TREATMENT

(71) Applicant: International Business Machines Corporation, Armonk, NY (US)

(72) Inventors: Brian M. O'Connell, Research Triangle Park, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/715,848

(22) Filed: May 19, 2015

(65) Prior Publication Data

US 2015/0256388 A1  Sep. 10, 2015

Related U.S. Application Data

(63) Continuation of application No. 14/253,333, filed on Apr. 15, 2014, now Pat. No. 9,219,786, and a continuation of application No. 12/968,429, filed on Dec. 15, 2010, now Pat. No. 8,799,454.

(51) Int. Cl.
*G06F 15/16* (2006.01)
*H04L 12/16* (2006.01)
(Continued)

(52) U.S. Cl.
CPC .......... *H04L 67/141* (2013.01); *H04L 41/0803* (2013.01); *H04L 47/762* (2013.01); *H04L 67/1002* (2013.01); *H04L 67/1004* (2013.01); *H04L 67/22* (2013.01); *H04L 67/42* (2013.01)

(58) Field of Classification Search
CPC .............. H04L 29/06; H04L 29/08576; H04L 29/08072; H04L 29/0809; H04L 29/06095; H04L 29/06027; H04L 29/06421; H04M 3/56; H04M 7/006; H04M 3/567

USPC .......................................................... 709/227
See application file for complete search history.

(56) References Cited

U.S. PATENT DOCUMENTS 5,384,564 A * 1/1995 Wycoff ................ H04B 1/1615
340/7.35
5,907,544 A * 5/1999 Rypinski ................ H04H 20/67
370/337

(Continued)

FOREIGN PATENT DOCUMENTS

| EP | 06301204.1 A1 | 6/2007 |
| EP | 07015856.3 | 11/2007 |
| WO | 2005074487 A2 | 8/2005 |

OTHER PUBLICATIONS

English translation of Chinese Abstract of CN101764832A, Application No. CN20081240766 Dec. 23, 2008, Jun. 30, 2010.

(Continued)

*Primary Examiner* — David Lazaro
*Assistant Examiner* — Mahran Abu Roumi
(74) *Attorney, Agent, or Firm* — Ronald Kaschak; Robert C. Rolnik

(57) ABSTRACT

Embodiments for server connection optimization in a persistently connected publish/subscribe environment are provided. A computer assigns an initial activity category for a client. The computer logs, into a log file, one or more select operations of a connection between a client and a first server. The computer calculates a ratio of a number of the select operations to a check time of the first server, wherein the check time is a period of time that has elapsed since a previous review of logged data. The computer sets a second activity category for the client based on a look-up of the ratio in a schedule of ratio ranges in a control file, wherein the second activity category is not the initial activity category. The computer transfers the client from the first server to a second server, in response to setting the second activity category.

6 Claims, 6 Drawing Sheets

(51) Int. Cl.
*H04L 29/08* (2006.01)
*H04L 12/24* (2006.01)
*H04L 12/923* (2013.01)
*H04L 29/06* (2006.01)

(56) References Cited

U.S. PATENT DOCUMENTS

| | | | |
|---|---|---|---|
| 6,173,312 B1 | 1/2001 | Atarashi et al. | |
| 6,343,313 B1 | 1/2002 | Salesky | |
| 6,788,939 B2 | 9/2004 | Truong et al. | |
| 6,834,305 B1 * | 12/2004 | Haynes | H04L 67/14 709/200 |
| 6,996,570 B2 | 2/2006 | Noble et al. | |
| 7,290,056 B1 | 10/2007 | McLaughlin, Jr. | |
| 7,437,461 B2 | 10/2008 | Sugizaki | |
| 7,677,967 B2 | 3/2010 | Jessop | |
| 7,730,190 B2 | 6/2010 | Coile et al. | |
| 7,788,352 B2 | 8/2010 | Breuer et al. | |
| 8,073,002 B2 * | 12/2011 | Minami | H04L 12/2602 370/359 |
| 8,224,964 B1 * | 7/2012 | Fredrickson | H04L 29/08729 709/227 |
| 2001/0027491 A1 | 10/2001 | Terretta et al. | |
| 2001/0039585 A1 | 11/2001 | Primak et al. | |
| 2002/0038370 A1 * | 3/2002 | Demoto | H04L 12/5692 709/227 |
| 2002/0061760 A1 * | 5/2002 | Maggenti | H04L 63/0428 455/518 |
| 2002/0116258 A1 | 8/2002 | Stamatelatos et al. | |
| 2003/0012149 A1 * | 1/2003 | Maggenti | H04M 3/56 370/260 |
| 2003/0061363 A1 | 3/2003 | Bahl et al. | |
| 2004/0010588 A1 * | 1/2004 | Slater | H04L 29/06027 709/224 |
| 2005/0177833 A1 | 8/2005 | Sauermann | |
| 2006/0036679 A1 | 2/2006 | Goodman et al. | |
| 2006/0224668 A1 | 10/2006 | Ginis | |
| 2007/0061282 A1 | 3/2007 | Ganguly et al. | |
| 2007/0064725 A1 * | 3/2007 | Minami | H04L 12/2602 370/463 |
| 2007/0168242 A1 * | 7/2007 | Brown | A61B 5/0002 600/300 |
| 2007/0174233 A1 | 7/2007 | Ginis et al. | |
| 2007/0190980 A1 | 8/2007 | Britt et al. | |
| 2008/0102815 A1 | 5/2008 | Sengupta et al. | |
| 2008/0127209 A1 * | 5/2008 | Gale | G06F 9/546 719/313 |
| 2009/0067850 A1 | 3/2009 | Mizutani et al. | |
| 2009/0240790 A1 * | 9/2009 | Utsunomiya | H04L 12/4645 709/221 |
| 2009/0248865 A1 | 10/2009 | Kodama et al. | |
| 2010/0169494 A1 | 7/2010 | Machulsky et al. | |

OTHER PUBLICATIONS

English translation of Chinese Abstract of CN101060534A, Application No. CN20071111029 Jun. 13, 2007, Oct. 24, 2007.
English translation of Chinese Abstract of CN101005369A, Application No. CN2006105378 Jan. 19, 2006, Jul. 25, 2007.
English Abstract of Chinese Prior Art of Application No. CN20081240766 Dec. 23, 2008, CN101764832A, Jun. 30, 2010.
English Abstract of Chinese Prior Art of Application No. CN20071111029 Jun. 13, 2007, CN101060534A, Oct. 24, 2007.
English Abstract of Chinese Prior Art of Application No. CN2006105378 Jan. 19, 2006, CN101005369A, Jul. 25, 2007.
Schlossnagle, Theo; Mod_Backhand use your resources; http://www.backhand.org/ApacheCon2001/US/backhand_course_notes.pdf; Apr. 5, 2001.
Srinivasan, Kiran; MTCP: Transport Layer Support for Highly Available Network Services; http://citeseerx.ist.psu.edu/viewdoc/download?doi-10.1.1.25.5921&rep=1&type=pdf; Oct. 2001.
Mahran Aburoumi, Office Action, Apr. 12, 2013.
Robert Rolnik, Response to Office Action, Jul. 12, 2013.
Robert Rolnik, Final Office Action, Oct. 1, 2013.
Robert Rolniki, Request for Continued Examination, Nov. 13, 2013.
Mahran Aburoumi, Office Action, Dec. 20, 2013.
Robert Rolnik, Response to Office Action, Jan. 7, 2014.
Mahran Aburoumi, Notice of Allowance, Mar. 24, 2014.
Robert Rolnik, Preliminary Amendment_Apr. 15, 2014.
Mahran Aburoumi, Notice of Allowance, May 13, 2015.
Mahran Aburoumi, Notice of Allowance, Sep. 15, 2015.

* cited by examiner

FIG. 4A
|   | CLIENT ID | ACTIVITY CATEGORY |
|---|-----------|-------------------|
| 451 | 19214 | HIGH |
|   | 00003 | MIDDLE |
|   | 99999 | LOW |
|   | 00001 | NULL |
|   | ••• | ••• |
450
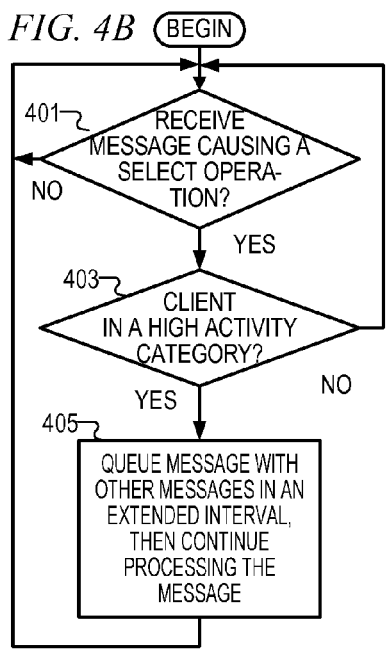
FIG. 4B
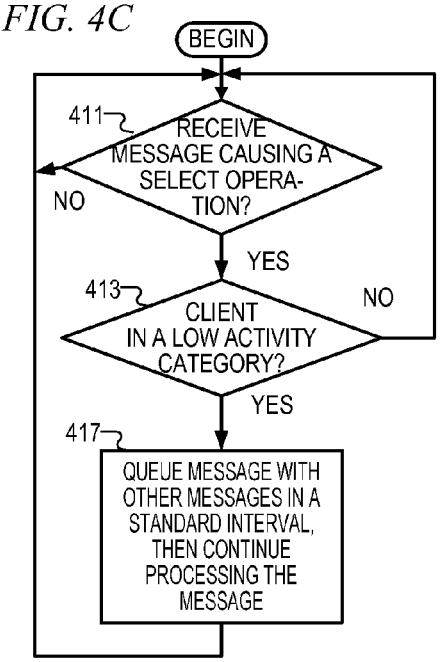
FIG. 4C

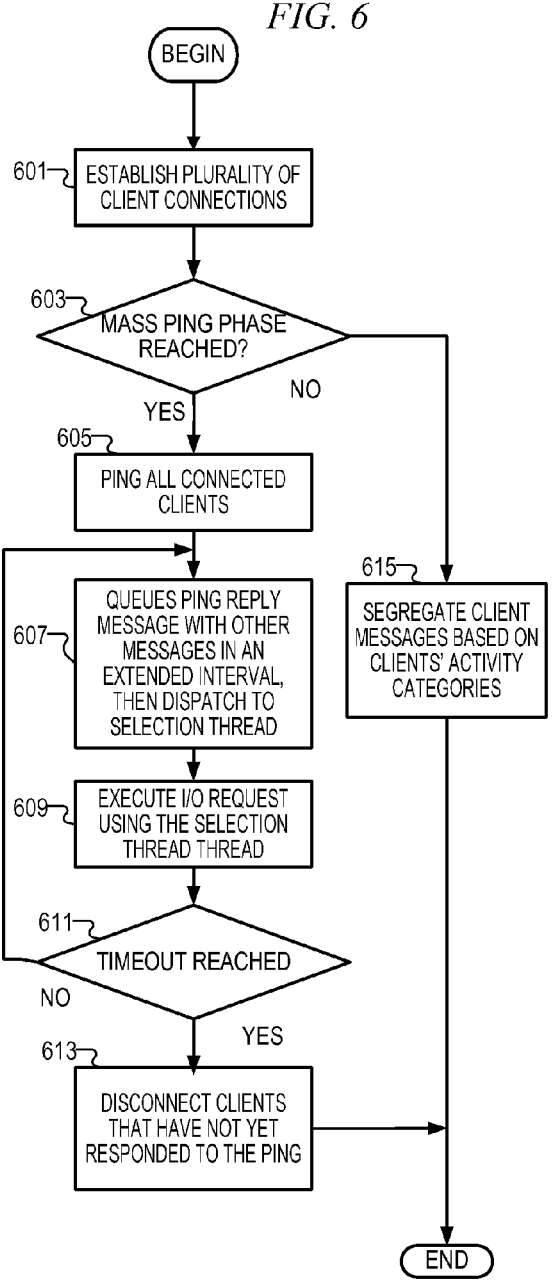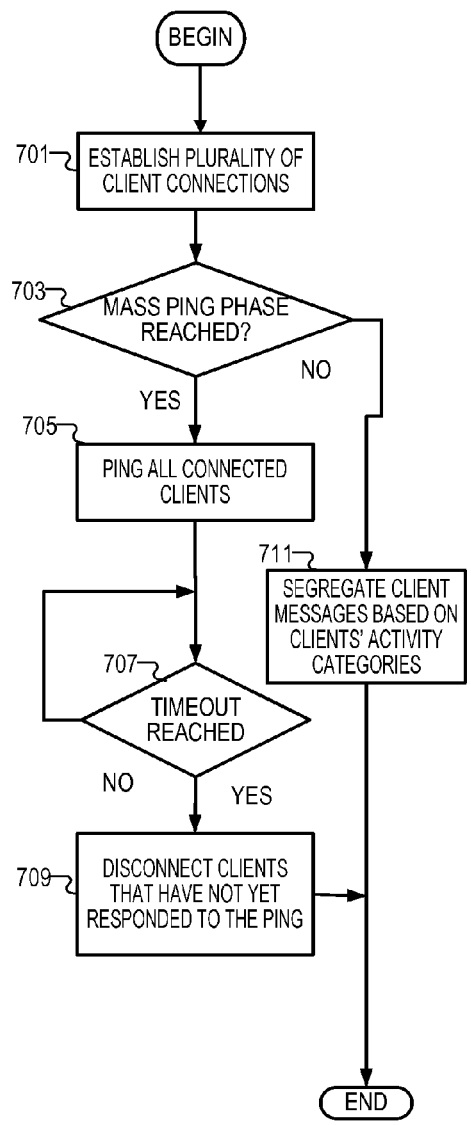

BEHAVIOR BASED CLIENT SELECTION FOR DISPARATE TREATMENT

This application is a continuation to commonly assigned and co-pending U.S. patent application Ser. No. 12/968,429 entitled "BEHAVIOR BASED CLIENT SELECTION FOR DISPARATE TREATMENT", filed on Dec. 15, 2010 and U.S. patent application Ser. No. 14/253,333 entitled "BEHAVIOR BASED CLIENT SELECTION FOR DISPARATE TREATMENT", filed on Apr. 15, 2014, and hereby incorporated by reference.

BACKGROUND

The present invention relates generally to a computer implemented method, data processing system, and computer program product for segregating clients subscribing to a service. More specifically, the present invention relates to segregation of client/server connections based on client behavior.

In recent decades, computers have transformed from a largely academic tool with occasional personal uses, to a personal accessory among those who want to remain informed. During this time, computer users have become increasingly dependent on receiving reports of specific events or news of various topics to suit their tastes. These computer users may utilize clients operating in computers to subscribe to newsworthy and other various topics. In a specific example, thousands of subscribers can be updated within seconds of a stock reaching a new 12 month high. Servers operating in a network provide reports to the subscribers in real-time, for example, on each uptick that takes a stock higher among the many stocks traded on a stock exchange. Social media is another scenario where clients, and especially mobile clients, may subscribe to various topics. For example, hundreds of thousands of clients may subscribe to topics, such as, a celebrity, using for example, Twitter® social media or Facebook® social media.

A client includes data processing system resources allocated to executing computer instructions to render data concerning messages and topics to a user through any convenient user interface. A client may perform other functions in support of messaging, such as, to allow a user to configure the language of the client, to establish power saving modes, and to inform the user of errors and status of the client. In contrast, client software is the instructions of the client serialized to storage or for transmission.

A server is a data processing system allocation of time and physical resources to execute instructions that respond to messages received from one or more clients and/or servers. The server can exist and be defined by the hardware so-allocated and by the state defined by memory, storage, registers and the like. As can be appreciated, a data processing system may host multiple servers contemporaneously. Resources can be memory and at least one processor assigned to performing a task.

SUMMARY

According to one illustrative embodiment, a method, data processing system and computer program product is disclosed for server connection optimization in a persistently connected publish/subscribe environment. A computer assigns an initial activity category for a client. The computer logs, into a log file, one or more select operations of a connection between a client and a first server. The computer calculates a ratio of a number of the one or more select operations to a check time of the first server, wherein the check time is a period of time that has elapsed since a previous review of logged data. The computer sets a second activity category for the client based on a look-up of the ratio in a schedule of ratio ranges in a control file, wherein the second activity category is not the initial activity category. The computer transfers the client from the first server to a second server, in response to setting the second activity category.

According to one illustrative embodiment, a computer program product is disclosed for server connection optimization in a persistently connected publish/subscribe environment. A computer program product has one or more computer-readable, tangible storage devices. When executed, the program instructions assign an initial activity category for a client. When executed, the program instructions log, into a log file, one or more select operations of a connection between a client and a first server. When executed, the program instructions calculate a ratio of a number of the one or more select operations to a check time of the first server, wherein the check time is a period of time that has elapsed since a previous review of logged data. When executed, the program instructions set a second activity category for the client based on a look-up of the ratio in a schedule of ratio ranges in a control file, wherein the second activity category is not the initial category. When executed, the program instructions transfer the client from the first server to a second server, in response to setting the second activity category.

According to one illustrative embodiment, a data processing system is disclosed for server connection optimization in a persistently connected publish/subscribe environment. The data processing system has one or more processors, one or more computer-readable memories and one or more computer-readable, tangible storage devices. The program instructions, which are stored on the one or more storage devices for execution by the one or more processors via the one or more memories, can be executed by the one or more processors to assign an initial activity category for a client. When executed, the program instructions log, into a log file, one or more select operations of a connection between a client and a first server. The program instructions, which are stored on the one or more storage devices for execution by the one or more processors via the one or more memories, can be executed by the one or more processors to calculate a ratio of a number of the one or more select operations to a check time of the first server, wherein the check time is a period of time that has elapsed since a previous review of logged data. The program instructions, which are stored on the one or more storage devices for execution by the one or more processors via the one or more memories, can be executed by the one or more processors to set a second activity category for the client based on a look-up of the ratio in a schedule of ratio ranges in a control file, wherein the second activity category is not the initial category. The program instructions, which are stored on the one or more storage devices for execution by the one or more processors via the one or more memories, can be executed by the one or more processors to transfer the client from the first server to a second server, in response to setting the second activity category.

According to one illustrative embodiment, a method is disclosed for batching ping replies. A computer transmits a scheduled ping to each of a plurality of clients. The computer queues a client message with at least one other client message. The computer processes a plurality of queued client messages to categorize a subset of the plurality of clients as responding clients. The computer determines that the timeout period is expired. The computer disconnects at least one client that has not responded to the scheduled ping during the timeout period.

According to one illustrative embodiment, a method is disclosed for batching ping replies. A computer transmits a scheduled ping specifying a return address dedicated to ping replies to each of a plurality of clients. The computer receives a plurality of ping responses to the return address. Responsive to receiving the plurality of ping responses to the return address, the computer updates a data structure of candidate clients for disconnect. The computer determines that a timeout period is expired. Responsive to the timeout period expiring, the computer disconnects one or more clients present in the data structure of candidate clients for disconnect.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4A is a table of client identifiers and corresponding activity category assignments in accordance with an illustrative embodiment of the invention.

FIG. 4B is a flowchart of delay scaling to discriminatorily queue clients assigned to a high activity category in accordance with an illustrative embodiment of the invention.

FIG. 4C is a flowchart of delay scaling to discriminatorily queue clients assigned to a low activity category in accordance with an illustrative embodiment of the invention.

FIG. 6 is a flowchart of ping grouping according to time in accordance with an illustrative embodiment of the invention; and FIG. 7 is a flowchart of ping grouping according to aggregate ping replies to a dedicated address or using a non-standard mode in accordance with an illustrative embodiment of the invention.

DETAILED DESCRIPTION

Figure 1:
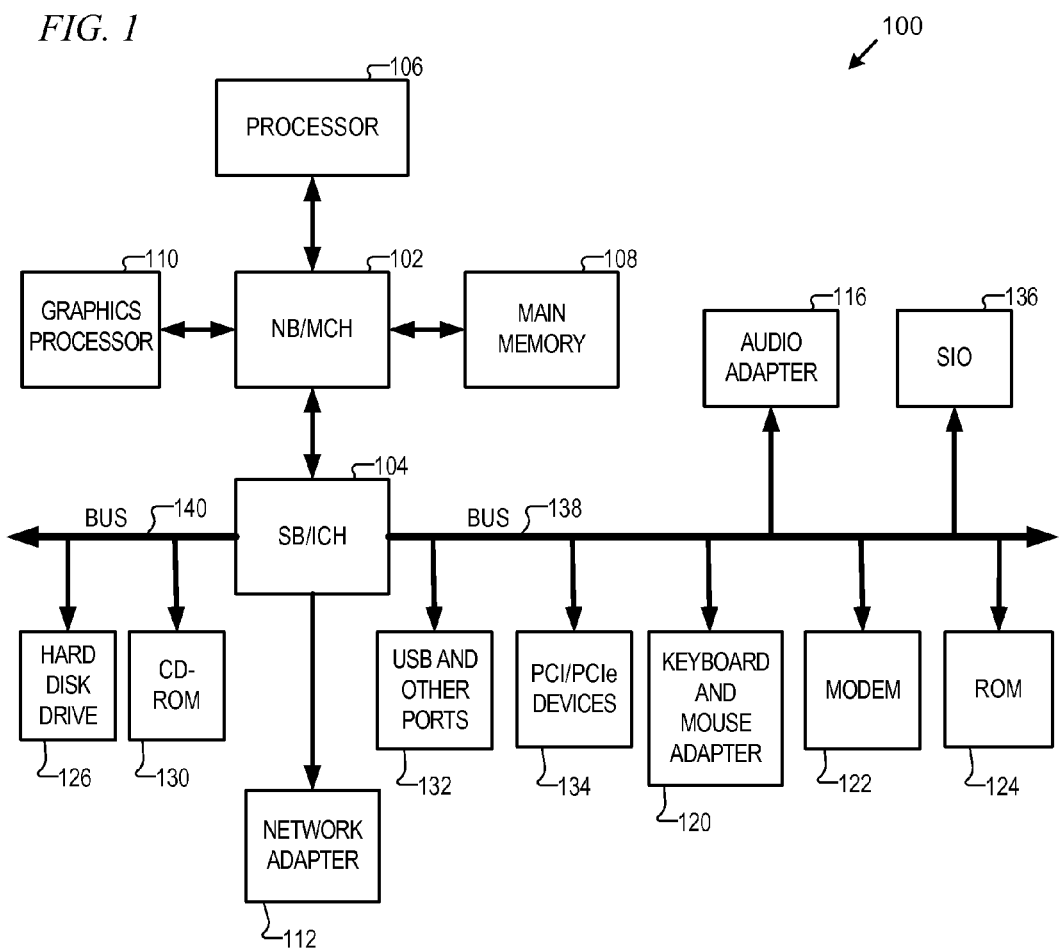
FIG. 1 is a block diagram of a data processing system in accordance with an illustrative embodiment of the invention.

With reference now to the figures and in particular with reference to FIG. 1, a block diagram of a data processing system is shown in accordance with an illustrative embodiment of the invention and in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 or bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Unix® or Microsoft® Windows®. Unix is a registered trademark of The Open Group in the United States and other countries. Microsoft and Windows are trademarks of Microsoft Corporation in the United States, other countries, or both. An object oriented programming system, such as the Java™ programming system, may run in conjunction with the operating system and provide calls to the operating system from Java™ programs or applications executing on data processing system 100. Java™ is a trademark or registered trademark of Oracle Corporation and/or its affiliates in the United States, other countries, or both.

Figure 3:
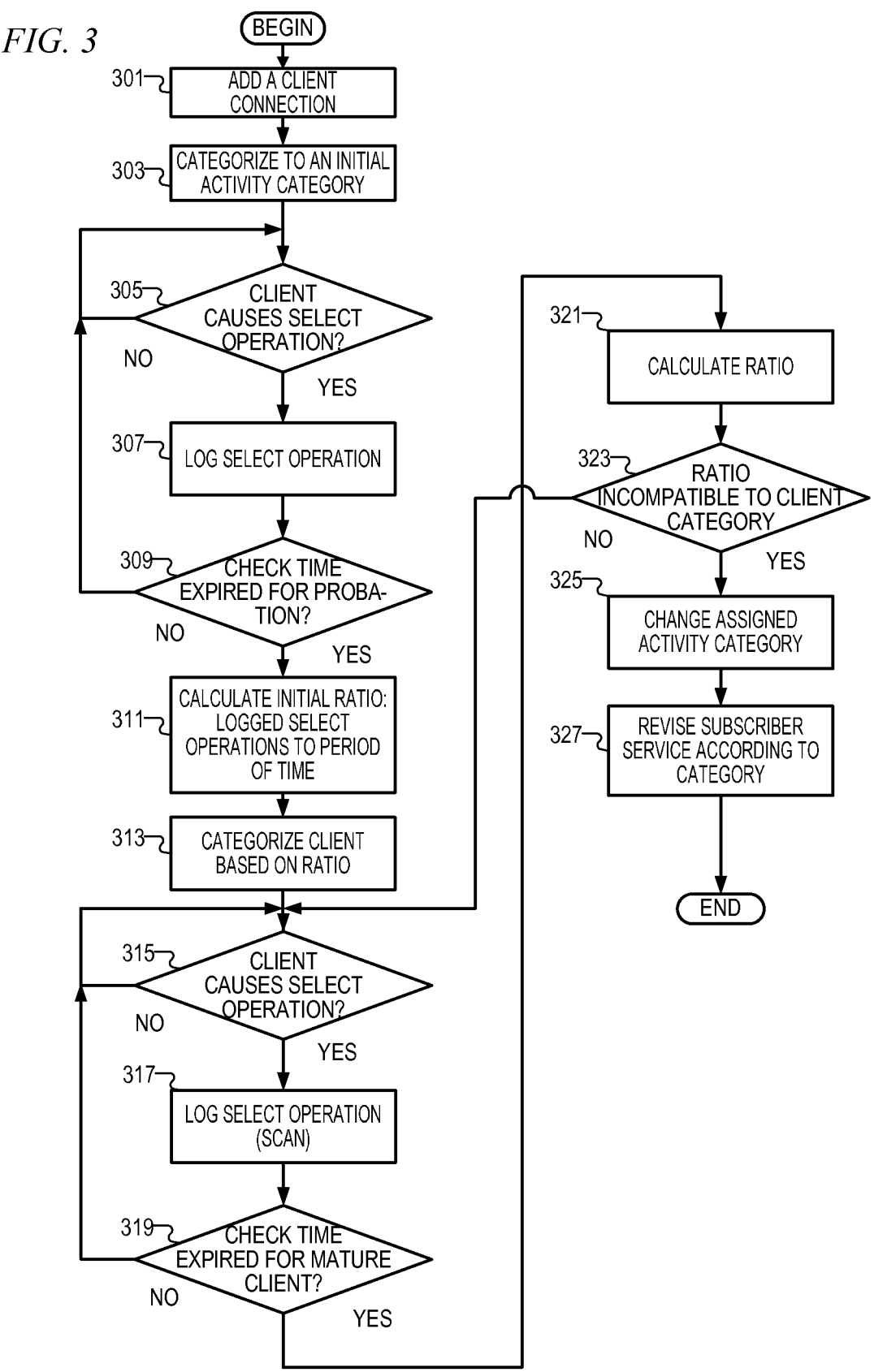
FIG. 3 is a flowchart of steps to categorize a client into one of at least two activity categories in accordance with an illustrative embodiment of the invention.

Instructions for the operating system, the object-oriented programming system, and applications or programs, such as the user interface program described herein with reference to FIG. 3 and the user interface program described herein with reference to FIG. 4, are located on at least one of one or more computer readable tangible storage devices, such, for example, as hard disk drive 126 or CD-ROM 130, for execution by at least one of one or more processors, such as, for example, processor 106, via at least one of one or more computer readable memories, such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

Servers that issue messages concerning topics do so in response to clients that subscribe to the topics. In this publish/subscribe (pub/sub) environment, a server performs various functions, including registering that a client has subscribed to a topic, registering that a client is not subscribing to a topic, registering that a client has logged on to form a client connection, or determining that a client is no longer responding to pings, among other messages. In conventional systems, many of the messages received by the server occur in a randomly distributed manner. The asynchronous nature of client messaging can cause a server to handle each message in an ad hoc manner. These unbatched and randomly distributed messages can cause a server to suffer under excessive loads, particularly when processor intensive messages arrive to a processor without adequately assigned resources to timely respond to the messages. Moreover, some clients transmit messages that cause server responses with high frequency. These frequent transmittals can place an extra heavy load on a server.

If such messages are delivered in a pub/sub environment, potentially slow or turned-off clients may also create processing delays at the server. In the course of developing the invention, the inventors discovered that a population of users have widely varying habits of accessing data. Moreover, mixtures of older equipment with newer equipment and varying networking infrastructures can cause pub/sub messaging to fall into patterns, within specific groups of users, where such patterns are different between such groups. For example, some users can be particularly attentive to switching among subscribed topics in a pub/sub environment. Accordingly, these frequent-topic-changers can potentially strain a server, and cause unwanted processing delays at badly configured servers.

The illustrative embodiments permit segregating a plurality of clients into groups based on frequency of messaging from the plurality of clients. Moreover, high volume messaging servers can be directed to handle loads of high activity clients such that inbound messages are batched over delay intervals to more efficiently handle volumes of messages that are comparatively higher for a group of high activity clients as compared to low activity clients. In addition, one or more illustrative embodiments allow a server to direct clients to cluster ping replies either according to narrow time periods, or to make ping replies to a specific network address or according to a specific network protocol.

Figure 2:
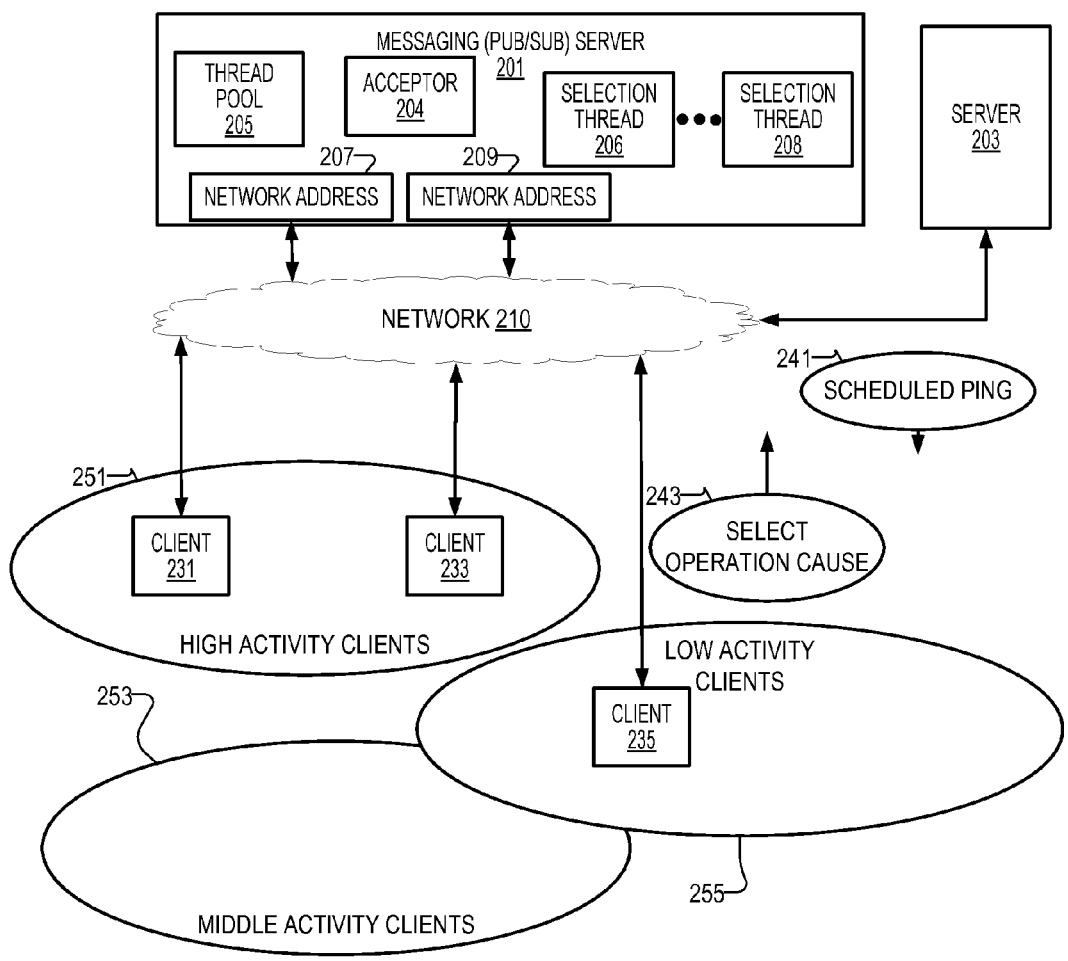
FIG. 2 is a block diagram of a networking environment in accordance with an illustrative embodiment of the invention.

FIG. 2 is a block diagram of a networking environment in accordance with an illustrative embodiment of the invention. FIG. 2 describes a pub/sub environment, which is an environment where clients may discover one or more servers that can asynchronously transmit, for example, messages relating to a topic. A pub/sub client or subscriber is a client that is configured to make subscriptions and maintain a persistent connection in a pub/sub environment. Clients 231, 233, and 235 are examples of pub/sub clients. Messaging server 201 connects to network 210 to exchange packets with clients, such as clients 231, 233, and 235. A packet is a unit into which information is divided for transmission across a network. A packet may include administrative information such as source, destination, serial number, protocol type and the like. A secondary server, such as server 203, may also connect to network 210 to exchange packets with clients, such as clients 231, 233, and 235.

In one illustrative embodiment, both messaging server 201 and server 203 can be logical partitions, whereby each shares resources of a common data processing system, although many resources are allocated exclusively to the use of one of messaging server 201 or server 203. In other words, this illustrative embodiment permits both servers to be present on a virtualized server. A virtualized server is one in which resources such as memory and storage are isolated and exclusively available to an operating system that executes relying on those resources. Nevertheless, a virtualized server can provide access between servers to a network interface card, in which case, each server may make asynchronous accesses to the card. In another illustrative embodiment, both messaging server 201 and server 203 may be arranged using some or all components of data processing system 100 of FIG. 1.

In the pub/sub environment of FIG. 2, a client, such as client 231, 233, or 235, may subscribe to a number of topics to which messaging server 201 dispatches periodic updates or publications. The client may be arranged using some or all components of data processing system 100 of FIG. 1. To get started, the client can initiate a persistent connection to messaging server 201. Initially, the client may read a configuration file that may define a default set of subscriptions and/or a server that hosts topics. The client may rely on network 210, which may be a combination of wired and wireless links. In this manner, the client may establish a persistent connection with messaging server 201.

Next, the client may transmit a transport control protocol (TCP) connection request to messaging server 201. The TCP connection request can include a subscription message using a publish-subscribe protocol. The subscription message may include, for example, a description of a topic, for example, "Stocks reaching new twelve months highs". At this point, a persistent connection may be established between the client and messaging server 201. A persistent connection is a connection between two data processing systems, using a link that may include a network, such that each data processing system maintains state information concerning the link until a data processing system disconnects the persistent connection or a data processing system fails to acknowledge a message of its counterpart within a timeout period. A client connection is a persistent connection where at least one of the data processing systems is a client. Although communication of packets between client and server may occur episodically, the persistent connection remains connected while both client and server have received messages within allowable tolerances, such as timeouts.

A connect method or connect mechanism is a specific protocol using specific uniform resource identifiers used to establish a connection. The initial connect mechanism utilized by the client can be TCP transmitted to an IP address of the server. In this case, TCP is the specific protocol, and the IP address is the uniform resource identifier.

Messaging server 201, may host several software components, such as, for example, Java objects. Software components may include acceptor 204, thread pool 205, and selection threads 206 and 208. Additional software components in messaging server 201 may control the receiving of environment data, concerning, for example, topics of interest to the users of the clients. An example of environment data may be recent stock quotes. Messaging server 201 can collect environment data locally or remotely.

Acceptor 204 can perform initial handling of newly established persistent client connections to messaging server 201. Thread pool 205 may assign an activity category to a client, such as client 231, 233, or 235, based on observed select operation behavior. A thread pool is a group of threads that can run arbitrary tasks assigned to the thread pool by a thread that is within or outside of the thread pool. A thread is a processor state, resources allocated to a processor, and machine instructions that are allocated processing time on the processor until the final step of the machine instructions is executed. A thread may be one among several threads that compete for time or clock cycles of the processor where the processor executes a single instruction at a time. An activity category is a category of one or more clients exhibiting select operation activity within a ratio range, as discussed in further detail below. Exemplary activity categories are high activity clients 251, middle activity clients 253, and low activity clients 255.

A 'select operation' is a request to a selection thread, such as selection thread 206 or 208, to provide a list of clients that are ready to receive messages. In other words, in a select operation, the selection thread chooses a set of clients whose corresponding TCP/IP buffers on a server are ready for I/O operations. A select operation may be occur in response to a new client being added to a selection thread, such as selection thread 206 or 208, or in response to a client, such as client 231, 233, or 235, sending a message to a server, such as messaging server 201. An additional cause of a select operation can be based on a status of a TCP/IP buffer of a server. The TCP/IP buffer can be full for a client, such as client 231, 233, or 235. Accordingly, messages handled by a full TCP/IP buffer can cause a message, outgoing from the server, to be queued. Queuing is a feature where the server accumulates messages in a buffer so that the messages can be processed together, thereby obtaining some efficiencies. Among the possible causes of select operations is select operation cause 243, which can be one or more packets sent by a client, such as client 231, 233, or 235, to a server, such as messaging server 201. Alternatively, a select operation can be indirectly caused by a client, such as client 231, 233, or 235, failing to acknowledge a message.

Messaging server 201 can log select operation behavior to a log, or other recordation, of the number of select operations that were caused by a TCP buffer of messaging server 201 associated with a client, such as client 231, 233, or 235, being full. For example, twenty seconds between two select operations caused by a client may be above a threshold previously set in messaging server 201 for the activity category in which the client is assigned. A threshold is a frequency of select operations that is permissible to be sustained by messaging server 201 before reclassifying the client to a new activity category. The threshold may be set by an administrator of messaging server 201, set as a default by a manufacturer of messaging server 201, adjusted based on loading of messaging server 201, or a combination of the foregoing. For example, when messaging server 201 is lightly loaded, the threshold may be higher than when messaging server 201 is heavily loaded. A "load" is the processor utilization of the processors of the server that is being referenced. The threshold is a boundary or edge condition to a set of numbers that qualify for an activity category.

Table 1 depicts an exemplary schedule of ratio ranges including several thresholds, wherein 'X' represents a ratio. A ratio range defines the criteria that excludes select operation behavior from an activity category if the select operation behavior is outside of the ratio range. In one exemplary embodiment, an administrator, or messaging server 201 itself, may flexibly set criteria or ratio ranges based on past experience, such that, for example, greater than 50% of clients are assigned to a low activity category when more than 100 clients are active. Each ratio in Table 1 is a relation of the number of times a client causes a select operation per a check-time. A check time can be, for example, 60 seconds.

TABLE 1

| Lower bound Of ratio range | Upper bound Of ratio range | Activity category |
| --- | --- | --- |
| None | $X < 2$ | Low activity category |
| $2 \leq X$ | $X < 5$ | Middle activity category |
| $5 \leq X$ | None | High activity category |

Accordingly, in one exemplary embodiment, thread pool 205 may categorize clients, such as clients 231, 233, or 235, into three activity categories: high activity clients 251, middle activity clients 253 and low activity clients 255. It is appreciated that the middle activity category, e.g., middle activity clients 253, can be defined by an upper threshold and lower threshold selected from a variety of thresholds to suit the situation. Accordingly, the thresholds applicable to the low activity category, e.g., low activity clients 255, and the high activity category, e.g., high activity clients 251, can be adjusted in a corresponding manner so that each ratio range does not overlap with a neighboring range. Accordingly, the middle activity category can be defined by lower thresholds above at least one client message per 60 seconds and upper thresholds below ten client messages per 60 seconds.

Each of selection threads 206 and 208 is assigned to process messages of a different activity category. In one illustrative embodiment, selection thread 206 may be dedicated to handling messages from clients assigned to a specific activity category, for example, low activity clients 255. Similarly, in another illustrative embodiment, selection thread 208 may be allocated to handling messages from clients in, for example, high activity clients 251. The messages may arrive via network address 207 or network address 209. Network address 207 and network address 209 may be TCP/IP addresses and port numbers.

It is appreciated that the thresholds in a table, such as Table 1, may be revised according to the availability of one or more servers, such as messaging server 201 and server 203, which can be beneficial in that selection threads 206 and 208 can utilize the table to transfer a subset of clients to exclusively interact (or connect) with a dedicated server based on the clients in the subset being associated with a specific activity category or activity categories. The dedicated server may be hosted on a data processing system that hosts the server to which the subset of clients are connected prior to the transfer, e.g., messaging server 201 or server 203. Alternatively, the dedicated server may be hosted on a second data processing system, distinct from, but linked via, e.g. a network to the server to which the subset of clients are connected prior to the transfer, e.g., messaging server 201 or server 203.

To further illustrate, a client, such as client 231, 233, or 235, may determine if it has received a message from a server, such as messaging server 201. If the client has received a message, such as scheduled ping 241, from the server, the client may acknowledge the message. A scheduled ping is a ping that recurs on a scheduled basis. In other words, the ping is part of a set of pings that recur on a periodic basis that can be preset by the system administrator. The client may acknowledge the message by sending a reply ping to the source of the message. A reply ping is a response transmitted to a source specified in the scheduled ping. The client may take further steps consistent with the message. For example, if the message relates to a topic that the client subscribes to, a corresponding change can be made to a user interface on the client, e.g. a dashboard.

In response to receiving messages from the client, the server allocates resources to handle the messages. For example, the server can allocate resources by transferring the client to a second server, such as server 203.

FIG. 3 is a flowchart of steps to categorize a client into one of at least two activity categories in accordance with an illustrative embodiment of the invention. Initially, a server may add a client connection (step 301). Adding a client connection includes the server and the client cooperatively exchanging and/or creating state information concerning the connection to form a persistent connection. In other words, responsive to the exchange of packets according to a networking protocol, the client and the server establish or otherwise record the data concerning the one or more packets exchanged, and optionally, the packets that are expected to be exchanged. The client can be, for example, client 231, 233, or 235 of FIG. 2. The server can be, for example, messaging server 201 or server 203 of FIG. 2.

Next, the server may categorize the client to an initial activity category (step 303). The initial activity category is the category assigned to a client connection in response to the establishment of the client connection. In one illustrative embodiment, the initial activity category can be a high activity category. A high activity category is any activity category that is specified by any ratio range that is not a ratio range in the lowest activity category. Next, the server detects whether the client causes a select operation (step 305). If the client has not caused a select operation, the server repeatedly performs step 305. Responsive to the server detecting that the client has caused a select operation, the server logs the select operation to a log file (step 307). A log file is a file stored to a log buffer, for example, in memory or storage. The log file may be arranged as a circular buffer, in which case the oldest entries can be overwritten by newer entries. Each log entry may comprise a time and a client identifier. The server can use one or more select operations recorded to a log to characterize behavior of the client.

Check times may be recurring periods used by the server to collect and log client behavior to a log. In response to completion of each check time, the server can review the log for activity during the check time and can make one or more calculations concerning the client. Accordingly, next, the server may determine if a check time expired for a probation period (step 309). A probation period is a duration after a client connection is added in step 301 and during which either data logged or habitual client behavior is indeterminate or otherwise inadequate to characterize. Check times can recur during and after the probation period. As a result, the server can use the recurring check times to evaluate any recent changes in behavior of the client and take action in response thereto. If a check time did not expire for the probation period, processing can resume at step 305.

If a check time expired for the probation period, the server may calculate an initial ratio of a number of the select operations to a period of time (step 311). In other words, if the period of time is set to 5 minutes, the server counts the number of select operations found in the log for the client during the last 5 minutes of the log file, divides by 5, and thereby forms a ratio for the client expressed in select operations per minute. It is appreciated that a ratio can be a number that merely is related, based on system default settings, to a passage of time, and does not require that a division operation be performed to calculate the ratio.

Next, the server may categorize the client based on the initial ratio (step 313). The categorizing can be based on a comparison of one or more recent ratios to a schedule of ratio ranges to check times, such as, for example, that described in Table 1 above. The schedule of ratio ranges to check times can define two or more ranges, each bounded by at least one threshold, that define the criteria for client behavior to be categorized in one of at least two activity categories, for example, a high activity category and a low activity category. Examples of three ratio ranges include below 2 select operations per 60 seconds, 2 select operations or above and less than 5 select operations per 60 seconds, and 5 select operations or above and less than 10 select operations per 60 seconds. Accordingly, clients that have caused selection operations defined by these ratio ranges can be categorized to a low activity category, a middle activity category, and a high activity category, respectively. In one illustrative embodiment, the server may store the schedule of ratio ranges to check times to a control file. A control file is a data structure in memory or storage that the server can read or access.

Next, the server may iteratively review and potentially reassign the client, as the client has left the probation period and has entered a mature phase. Once the server has maintained a persistent connection to the client longer than a probation period, the client is described as mature. Potential reassignments include reassigning the client to an activity category to which the client has not yet been assigned. In other words, an activity category to which the client has not been assigned is all remaining activity categories that the client has not be assigned to since the most recent addition of the connection for the client, as described in step 301. The server determines whether the client causes a select operation (step 315). If so, the server logs the select operation to the log file (step 317). Next, the server may determine if a check time expired for the mature client (step 319). If not, processing resumes at step 315. If so, the server calculates the ratio of a number of the select operations to the check time (step 321). Although the check time can be set to 60 seconds, it is appreciated that many alternative durations can be set for the check time.

Having determined the ratio, the server looks-up the ratio in the schedule of ratio ranges to check times. Accordingly, the server determines whether the ratio is incompatible to an activity category currently assigned to the client (step 323). If no incompatibility is determined, the server may resume at step 315. However, if the server determines that the ratio is incompatible to the activity category currently assigned to the client (positive outcome at step 323), according to the look-up of the ratio in the schedule of ratio ranges to check times, the server changes or resets the assigned activity category (step 325). In other words, the server can reassign the client to an activity category different than the currently assigned activity category. For example, if a client is categorized in the highest activity category in response to the server determining the initial ratio at step 311, but recently logged select operation behavior of the client is consistent with the lowest activity category, the server may change the assigned activity category of the client to the middle activity category. In other words, the server may, at least for the current check-time, make a client activity category assignment that corresponds to a ratio range adjacent to a current assignment for that client.

Responsive to changing or setting the assigned activity category of the client, the server may revise service provided to the client (step 327). For example, the server may transfer the client to a second server, in response to resetting the category. The second server may be hosted on a data processing system that hosts the first server. Alternatively, the second server may be hosted on a second data processing system, distinct from, but linked via, e.g. a network to the first server. The transfer can occur by a messaging server, such as messaging server 201 of FIG. 2, sending a transfer-to or a disconnect message with a transfer-to field. Accordingly, the server can specify a new IP address or hostname with which the client can connect.

FIG. 4A is a table of client identifiers and corresponding activity category assignments in accordance with an illustrative embodiment of the invention. A server, such as messaging server 201 or server 203 of FIG. 2, can use an identifier of a client that is the source of a message to lookup the activity category assigned to the client. The server can use table 450 to determine that a match is found when a particular client identifier matches a preferred activity category. If no match is found using an identifier of the client when looking up the activity category, then the determination that the client is in such an activity category is negative. It is appreciated that each activity category can be represented, in the table, with a unique character string, such as "high", as depicted in row 451, or a unique serial number that corresponds on a one-to-one basis with the category. Table 450 can include a row for each client that has connected to the server regardless of current connection state, or alternatively, for only those clients that have active connections to the server. If table 450 is set up to assign categories of all clients, regardless of connection state, then unconnected clients may be recorded to have no activity category association, for example, by placing null data in the corresponding activity category field for the client. Table 450 can be stored in a volatile or non-volatile memory of the server, such as main memory 108, hard disk drive 126, or CD-ROM 130 of FIG. 1.

FIG. 4B is a flowchart of delay scaling to discriminatorily queue clients assigned to a high activity category in accordance with an illustrative embodiment of the invention. The steps of FIG. 4B can be performed by a selection thread, such as selection thread 206 of messaging server 201 of FIG. 2. Initially, the selection thread determines whether it received a message that causes a select operation (step 401). If no message is received, the selection thread may repeatedly check for received messages. If a message has been received, the selection thread determines whether a client from which the message was received is in the high activity category (step 403). The determination of step 403 can be made by referring to table 450 or another data structure that has a category descriptor assigned to an identifier of each client. In other words, an identifier of the client that is the source of the message is used as a key to lookup the corresponding activity category of the client. Step 401 may be repeated while waiting for a message that meets its criterion.

If the client is in the high activity category, the selection thread queues the message with other messages for an extended interval and then continues processing the message (step 405). An extended interval is an interval that is longer than a standard interval. An example of an extended interval may be about 300 milliseconds. An example of a standard interval may be about 200 milliseconds. The extended interval and standard interval are periods during which messages are grouped, for example, to a queue associated with an activity category for a collective processing of all messages in the queue together in response to the conclusion of the extended interval and/or standard interval. Processing of messages in groups permits the server to achieve greater efficiency as compared to processing each message individually. Discriminating among messages based on client activity categorization is a form of providing a different service in response to a client's assigned activity category, as discussed with respect to step 327 of FIG. 3.

FIG. 4C is a flowchart of delay scaling to discriminatorily queue clients assigned to a low activity category in accordance with an illustrative embodiment of the invention. The steps of FIG. 4C can be performed by a selection thread, such as selection thread 208 of messaging server 201 of FIG. 2. Initially, the selection thread determines if a message that causes a select operation is received (step 411). Step 411 can be repeated for the duration that it determines no message meeting its criteria is received. If no message is received, the selection thread may repeatedly check for received messages. Responsive to receiving a message, the selection thread may determine if a client from which the message was received is the low activity category (step 413). The determination of step 413 is made by referring to table 450 or another data structure that has a category descriptor assigned to an identifier of each client. In other words, an identifier of the client that is the source of the message is used as a key to lookup the corresponding activity category of the client.

If the client is not in the low activity category, processing resumes at step 411. On the other hand, if the client is in the low activity category, the selection thread queues the message with other messages for a standard interval and then continues processing the message (step 417). Further processing occurs at step 411.

Figure 5A:
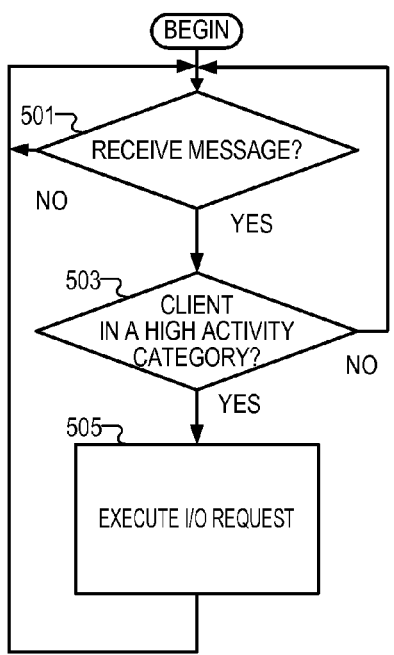
FIG. 5A is a flowchart of thread selection, which retains current thread control, in accordance with an illustrative embodiment of the invention.

FIG. 5A is a flowchart of thread selection, which retains current thread control, in accordance with an illustrative embodiment of the invention. The approach is called thread selection. Processing of inbound messages is performed by a selection thread of the messaging server, such as selection thread 206 or 208 of FIG. 2. Initially, the selection thread may determine whether it received a message that causes a select operation (step 501). If such a message occurred, the selection thread may determine whether a client that sent the message to the server is categorized in a high activity category (step 503). In one illustrative embodiment, the selection thread may utilize table 450 of FIG. 4A in determining whether the client that sent the message to the server is categorized in the high activity category. If the message is not from a client categorized in the high activity category, the selection thread may repeat step 501. If the client is categorized in the high activity category, the selection thread can continue the specific operations of the message and responses thereto (step 505). These operations include, for example, change topic operations, disconnect and freeing of resources operations, and clearing of ping counts pertaining to the client operations.

Figure 5B:
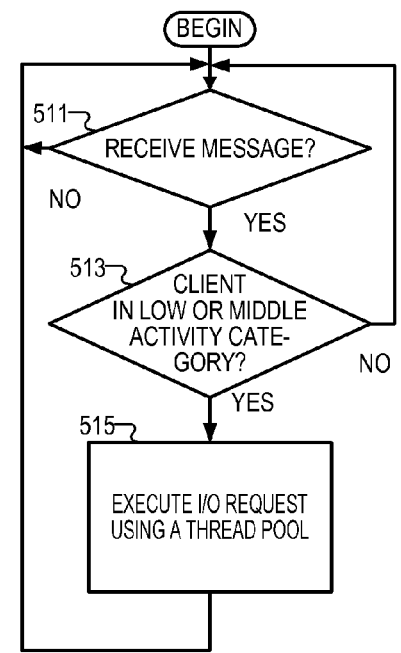
FIG. 5B is a flowchart of thread selection, which adopts differing strategies as to the division of labor among threads in response to client categorization in accordance with an illustrative embodiment of the invention.

FIG. 5B is a flowchart of thread selection, which adopts differing strategies as to the division of labor among threads in response to client categorization in accordance with an illustrative embodiment of the invention. Processing of inbound messages is performed by a selection thread of the messaging server, such as selection thread 206 or 208 of FIG. 2. Initially, the selection thread may determine whether it received a message that causes a select operation (step 511). If such a message occurred, the selection thread may determine whether a client that sent the message to the server is categorized in a low or middle activity category (step 513). In one illustrative embodiment, the selection thread may utilize table 450 of FIG. 4A in determining whether the client that sent the message to the server is categorized in the low or middle activity category. If the message is not from a client categorized in either of those categories, the selection thread may repeat step 511. If the client is categorized in one of those activity categories, the selection thread can execute an I/O request of the message using a thread pool (step 515). The thread pool can be, for example, the thread pool 205 of FIG. 2. The dispatch of threads in the thread pool can lower request latency. The latency is lower at least in multi-core systems as compared dedicated use of the selection thread. In both FIGS. 5A and 5B, the initial steps, 501 and 511, respectively, repeat themselves while their respective criteria remain unmet.

Some efficiencies can be obtained through a server performing routine testing of client responsiveness through pings. The server may assign an unresponsive client to a null or other inactive state. More importantly, the server can skip sending updates to clients that are known to be unresponsive. However, pinging and the resulting processing load that occurs while waiting to collect ping responses itself places a load on the server. This load can be reduced if the responses can be handled in a batched manner. FIGS. 6 and 7 below illustrate two ways to batch or otherwise dedicate server resources to incoming ping replies from clients. By aligning ping replies to specific time intervals, or otherwise corresponding these ping replies to a server's address, the server can attain efficiencies not otherwise available. One way of aligning ping replies is to issue pings to all connected clients at roughly the same time, for example, at the end of every other minute. Since the tendency is for clients to respond to pings in most networks within a few hundred milliseconds, most of the time, between pinging, ping replies will be sparse once the initial bulk of ping replies is received.

FIG. 6 is a flowchart of ping grouping according to time in accordance with an illustrative embodiment of the invention. Ping grouping is a class of techniques that segregate ping replies. One way to segregate ping replies is to group the occurrence of the replies to specific time periods. Because ping reply timing correlates to the issuance of the ping, ping replies can be caused to occur, predominantly, in a period after the ping. Accordingly, a rapid issuance of pings from a server within, for example, a second, to all clients currently connected to the server, may form a mass ping. A mass ping phase is the scheduled duration of pings issued from the server to all clients currently connected to the server. A mass ping phase can be scheduled to occur after predetermined intervals that permit the server to cull its list of connected clients, without incurring unnecessary server utilization or network congestion. For example, a mass ping phase can be scheduled, for all client connections, to occur every two minutes. FIG. 6 explains a first way of performing ping grouping.

Initially, a server establishes a plurality of client connections (step 601). The server can be, for example, messaging server 201 or server 203 of FIG. 2. Next, the server determines whether a mass ping phase is reached (step 603). If the mass ping phase has not been reached, the server can continue normal processing of received messages, for example, by segregating client messages based on clients' activity categories (step 615).

Otherwise, in response to reaching the mass ping phase, the server pings all connected clients (step 605). The connected clients can be one or more of clients 231, 233, and 235 of FIG. 2. Next, the server queues ping reply messages with other messages and then dispatches the processing of the queued messages to a selection thread, such as selection thread 206 or 208 of FIG. 2 (step 607). The selection thread processing can be scheduled at a predetermined time after the mass ping phase, for example, using the extended interval, defined above. A queued client message is a client message that is queued in this manner. Next, the server, via the selection thread, executes the I/O requests of the messages present in the queue (step 609). A common timeout may be used for all pings of step 605. A timeout is a predetermined time at which the server may change the state of a connection with a particular client, after the server fails to receive a response to the corresponding ping. The predetermined time can be set to expire based on an event that occurs contemporaneously with a ping to a particular client, such as, for example, the mass ping phase that is initiated within seconds of issuing a ping to the particular client. Accordingly, the server may use a common timeout for all clients pinged in a mass ping to determine if the timeout for ping replies has expired for any particular client. Thus, the server may repeatedly determine if that timeout is reached (step 611). In other words, the server can perform queuing step 607 and execute-i/o-step 609 multiple times before the timeout is reached. As part of step 611, the server may update a data structure of candidate clients of the connected clients for disconnect. In other words, for each reply ping received, the server may mark the client as connected, and for each reply ping not yet received, the server may identify the client as a candidate for disconnection. If the timeout is not reached, steps 607 and 609 can be repeated.

However, if the timeout is reached, the server may disconnect clients that have not yet responded to the ping (step 613). Step 613 can be modified for some embodiments to permit a client to be recorded as connected, by the server, until the client fails to respond to a preset number of consecutive pings. Processing terminates after steps 613 or 615.

FIG. 7 is a flowchart of ping grouping according to aggregate ping replies to a dedicated address or using a non-standard mode in accordance with an illustrative embodiment of the invention. FIG. 7 explains a second way of performing ping grouping. Thus, another way to segregate ping replies is to define within a ping message a specialty return address port dedicated to handling ping replies. Initially, a server establishes a plurality of client connections (step 701). The server can be, for example, messaging server 201 or server 203 of FIG. 2. If no mass ping phase occurred (step 703), the server can continue normal processing of received messages, for example, by segregating client messages based on the clients' activity categories (step 711).

Otherwise, in response to reaching the mass ping phase, the server pings all client connections (step 705). A mass ping can be scheduled, for all client connections, to occur, for example, every two minutes. One way to ping the clients, which clients can be, for example, clients 231, 233, or 235 of FIG. 2, is for the server to specify a specialty return address, in the ping message, that differs from the server's address used on the persistent connections between the clients and the server. The server may use a common timeout for all pings of step 705. Thus, the server may repeatedly determine if that timeout is reached (step 707). Like FIG. 6, the server will measure the timeout on the basis of a beginning or end of the pings being issued during the mass ping phase. If the timeout is not reached, the server can repeatedly determine whether the timeout has occurred. In response to the timeout being reached, the server may disconnect clients that have not yet responded to the ping (step 709). Processing terminates after steps 709 or 711.

An alternative way of performing step 705 is for the server to specify to the clients that a User Datagram Protocol (UDP) is to be used for ping replies. In other words, the server can add a non-standard bit to a ping message that informs the client to use a non-standard reply mode, namely, UDP. The server can set the bit to one when using the non-standard mode for ping replies, and to zero when making a routine ping reply to the TCP source.

The foregoing specification discloses several ways to time, address, or use a division of labor among threads to handle incoming messages or other causes of select operations in a pub/sub environment. A manner for characterizing client connection behavior is first disclosed. Once client connections are categorized to categories such as high activity or low activity, a server can discriminate, among inbound messages, inbound messages causing select operations and queue such select operations during an extended interval or not. Thereby, some server efficiencies can be developed. Further, the server may segregate high activity clients and treat the high activity clients with common use of a selection thread for both receipt of messages from the high activity clients and further responsive processing of the messages. In addition, various methods to concentrate ping replies are also disclosed.

A data processing system suitable for storing and/or executing program code can include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage device(s) may be utilized. The term "computer-readable storage device" does not encompass a signal propagation media such as a copper cable, optical fiber or wireless transmission media. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention is presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system for managing server connections between client computers and servers, the data processing system comprising:
   one or more processors, one or more computer-readable memories and one or more computer-readable, storage devices, and program instructions stored on the one or more storage devices for execution by the one or more processors via the one or more memories, the program instructions comprising;
   program instructions to assign an initial server-activity category for a first client computer;
   program instructions to log one or more select operations requested by the first client computer to a first server;
   program instructions to calculate a ratio of a number of the one or more select operations to a predetermined period of time during which the one or more select operations were logged; and
   program instructions to replace the assignment of the initial server-activity category with a second, different, server-activity category for the first client computer based on the ratio, and in response, transfer the first client computer from the first server to a second server to process subsequent requests by the first client computer, wherein the second server-activity category is a middle server-activity category having a corresponding middle ratio range, the initial server-activity category having a corresponding initial ratio range covering a range higher than the middle ratio range;
   and wherein a third server-activity category having a corresponding third ratio range, the third ratio range covering a range lower than the middle ratio range, wherein the second server-activity category is a middle server-activity category comprising a ratio range an upper threshold of, at most, ten select operations per 60 seconds.

2. The data processing system product of claim 1, further comprising, program instructions to place a received message from the first client computer in a queue with other messages such that the messages are processed in a first interval shorter than a second interval used with client computers assigned to the initial server-activity category, responsive to replacing the assignment of the first client computer to the second server-activity category.

3. A computer program product for managing server connections between clients and servers, the computer program product comprising:
   a computer readable storage device having program instructions stored thereon, the program instructions comprising:
   program instructions to assign an initial server-activity category for a first client computer;
   program instructions to log one or more select operations requested by the first client computer to a first server;
   program instructions to calculate a ratio of a number of the one or more select operations to a predetermined period of time during which the one or more select operations were logged; and
   program instructions to replace the assignment of the initial server-activity category with a second, different, server-activity category for the first client computer based on the ratio, and in response, transfer the first client computer from the first server to a second server to process subsequent requests by the first client computer, wherein the second server-activity category is a middle server-activity category having a corresponding middle ratio range, the initial server-activity category having a corresponding initial ratio range covering a range higher than the middle ratio range;
   and wherein a third server-activity category having a corresponding third ratio range, the third ratio range covering a range lower than the middle ratio range, wherein the second server-activity category is a middle server-activity category comprising a ratio range an upper threshold of, at most, ten select operations per 60 seconds.

4. The computer program product of claim 3, further comprising, program instructions to place a received message from the first client computer in a queue with other messages such that the messages are processed in a first interval shorter than a second interval used with client computers assigned to the initial server-activity category, responsive to replacing the assignment of the first client computer to the second server-activity category.

5. A method for managing server connections between clients and servers, the data method comprising:
   a server assigning an initial server-activity category for a first client computer;
   the server logging one or more select operations requested by the first client computer to a first server;
   the server calculating a ratio of a number of the one or more select operations to a predetermined period of time during which the one or more select operations were logged; and
   the server replacing the assignment of the initial server-activity category with a second, different, server-activity category for the first client computer based on the ratio, and in response, transferring the first client computer from the first server to a second server to process subsequent requests by the first client computer, wherein the second server-activity category is a middle server-activity category having a corresponding middle ratio range, the initial server-activity category having a corresponding initial ratio range covering a range higher than the middle ratio range; and wherein a third server-activity category having a corresponding third ratio range, the third ratio range covering a range lower than the middle ratio range, wherein the second server-activity category is a middle server-activity category comprising a ratio range an upper threshold of, at most, ten select operations per 60 seconds.

6. The method product of claim 5, further comprising, responsive to replacing the assignment of the first client computer to the second server-activity category, placing a received message from the first client computer in a queue with other messages such that the messages are processed in a first interval shorter than a second interval used with client computers assigned to the initial server-activity category.

* * * * *